9305X
J. H. Hubbard,
Washing Machine.
Patented Jan. 6, 1836.
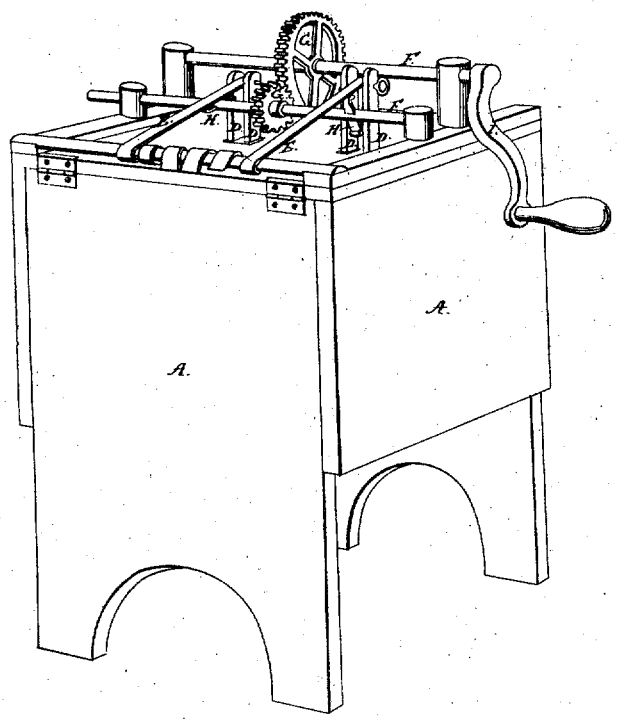
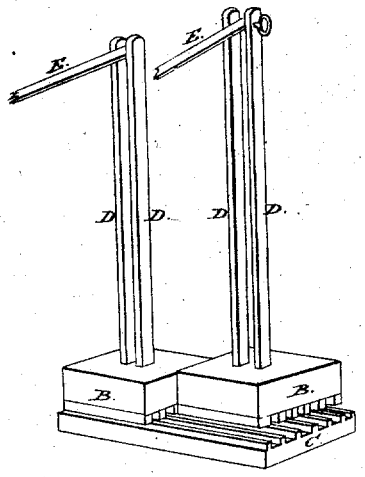

9305X

Jan 6, 1836

Joab H. Hubbard, of Bloomfield. Conn^t.
Letters Patent

The schedule referred to in these Letters Patent and making part of the same containing a description in the words of the said Joab H. Hubbard himself of his improvement in the machine for washing clothes –

---

To all to whom these presents shall come – Be it known that I Joab H. Hubbard of the Town of Bloomfield, County of Hartford and State of Connecticut have invented a new & useful improvement in washing clothes or like materials by a machine and that the following is an exact description thereof. The machine I describe & the figure I give as a part of my Specification hereunto annexed describes the true exterior form & proportions of all the parts of my machine. but the best size for one of my machines is a box eighteen inches wide twenty one inches and fifteen inches deep standing on legs, taking the one in my Specification & figure as a model, it will be easy to make a machine of the size I use. Take then a wood box of six inches width seven inches length and five inches depth with a lid fastened on one side or edge, with butts; place in the bottom of this box inside two hard pieces of wood of equal size about two inches wide and one and a half deep, nearly covering the bottom of the box made smooth & fitted to operate as pounders on the under side of these pieces or pounders, attach six pieces of hard wood each about one quarter of an inch square and two inches in length, made smooth and fastened parallel to each other at equal distances corresponding to six pieces of the same size which are to be made fast to the bottom of the box running parallel across, the whole bottom the same way as the other pieces so that the pieces on the pounders and those on the bottom will interlock with each other respectively when the pounders are let down upon the bottom of the box. Between the pounders is a thin piece of wood attached to the cover or lid and suspended so as to keep the two pounders from interfering – To the pounders there is attached severally two rods of wood passing parallel from the centre of the pounder up through the top of the box of the size of two and a half inches and extending two inches above the top of the box & perforated with holes so as to receive an iron pin and to each pin there is a steel spring running from said pin to the edge of said lid as hereinafter mentioned and as appears in the figure, which pin may be raised as wished by means of the 9305X Jan 6, 1836 holes made in said rods near the top thereof. Underneath each spring is placed an iron shaft of one quarter of an inch diameter running across the box & resting on two posts one inch high & placed one inch from the middle of the box & on the same side the springs are. In the centre of the shaft is a gear wheel of metal one inch diameter, equally distant between the springs, underneath each spring in the shaft & passing through the same at right angles are thin pieces of iron one eighth of an inch thick & one & one quarter of one inch long the width corresponding with the width of the spring which is three quarters of one inch & operating as cams or cranks, against the under side of the springs to raise them & likewise to raise the pounders which are brought back again by the elasticity of the spring. The springs pass parallel from the edge of the lid to the pins aforesaid, at the distance of two & one half inches from each other; they are seven inches long & half of their length at the lower end is made spiral.
Parallel to this shaft called the lower shaft at a suitable distance for the two wheels herein mentioned to move into each other, is placed another or higher shaft of the same dimensions resting on similar posts of double the height as the former ones, on which is attached in like manner another wheel of metal two inches in diameter playing into the one above mentioned giving it two revolutions to one of the other. On the end of either shaft is attached (and I prefer the lower one) a crank by which the whole is moved. The upper shaft is not indispensible. All the operating part including the pounders is attached to the lid so that when the lid is turned up the box is empty. I do not claim as my invention only of the parts of this machine nor any other of its combinations except that I do claim as my own invention the combination of said springs & said cams with said shafts & wheels so applied as described herein to produce the effect of washing clothes & like materials –
The machine is put in motion by turning a crank & the clothes & water are placed in said box.

Witnesses
W. W. Ellsworth
Giles P. Melbone

Joab H. Hubbard (Patented 6 Jany 1836)